United States Patent
Smith

(10) Patent No.: US 9,302,628 B2
(45) Date of Patent: Apr. 5, 2016

(54) DUAL ACCESS VEHICLE STORAGE ASSEMBLY

(71) Applicant: Lund Motion Products, Inc., Buford, GA (US)

(72) Inventor: Anthony Smith, Costa Mesa, CA (US)

(73) Assignee: Lund Motion Products, Inc., Buford, GA (US)

( * ) Notice: Subject to any disclaimer, the term of this patent is extended or adjusted under 35 U.S.C. 154(b) by 0 days.

(21) Appl. No.: 14/242,620

(22) Filed: Apr. 1, 2014

(65) Prior Publication Data

US 2014/0291372 A1    Oct. 2, 2014

Related U.S. Application Data

(60) Provisional application No. 61/807,558, filed on Apr. 2, 2013.

(51) Int. Cl.
*B60R 7/04* (2006.01)
*E05D 15/50* (2006.01)
*E05D 7/10* (2006.01)

(52) U.S. Cl.
CPC ............... *B60R 7/04* (2013.01); *E05D 7/1066* (2013.01); *E05D 15/502* (2013.01)

(58) Field of Classification Search
CPC B60N 2/4686; B60R 7/04; B60R 2011/0007; E05D 15/50; E05D 15/502; E05D 7/10; E05D 7/1061; E05D 7/1066; E05D 7/1072; E05D 7/1077; E05D 15/505

USPC ......... 49/192; 220/259.2, 520, 521, 817, 819, 220/826, 833, 835; 224/275, 282, 539, 926; 248/311.2; 296/24.34, 37.14, 37.8

See application file for complete search history.

(56) References Cited

U.S. PATENT DOCUMENTS

| | | | | |
|---|---|---|---|---|
| 114,579 A | * | 5/1871 | Marston | ................ E05D 15/505 16/371 |
| 505,480 A | * | 9/1893 | Pletcher | ................ E05D 15/505 16/232 |
| 770,595 A | * | 9/1904 | Lovette | ........................... 16/260 |
| 1,496,466 A | * | 6/1924 | Jackson | ........................... 16/260 |
| 1,883,793 A | * | 10/1932 | Johnson | ........................ 132/300 |
| 2,131,802 A | * | 10/1938 | Harmon | ................ E05D 7/1077 126/214 R |
| 2,555,473 A | * | 6/1951 | Deaton | ........................ 220/4.23 |

(Continued)

FOREIGN PATENT DOCUMENTS

| | | | | |
|---|---|---|---|---|
| DE | 3111595 A1 | * | 10/1982 | ................ E05D 7/02 |
| DE | 19907767 A1 | * | 8/1999 | ................ E05D 7/02 |

(Continued)

*Primary Examiner* — Glenn Dayoan
*Assistant Examiner* — Paul Chenevert
(74) *Attorney, Agent, or Firm* — Knobbe Martens Olson and Bear LLP

(57) ABSTRACT

A vehicle storage assembly can cover a vehicle storage area such as an interior console or a cargo box. The storage assembly can include a base and a lid. The lid can be opened from two sides to allow easy access for a driver and passengers to an interior storage compartment. The base includes at least two rods, which can act as axles for the lid to pivot about. The lid includes at least one rotation member or guide which can be released from the rod only when the lid is in a desired position, for example, a closed position. The lid can include a latch for each rod. The lid can have a lock to secure one or both of the latches with the lid in a closed position.

15 Claims, 18 Drawing Sheets

(56) References Cited

U.S. PATENT DOCUMENTS

| | | | | |
|---|---|---|---|---|
| 2,790,992 A * | 5/1957 | Campbell | | 16/232 |
| 2,811,349 A * | 10/1957 | Bondurant et al. | | 49/324 |
| 2,926,382 A * | 3/1960 | Knese et al. | | E05D 7/10 |
| | | | | 16/261 |
| 3,048,898 A * | 8/1962 | Davis | | 49/193 |
| 3,321,100 A * | 5/1967 | Toma | | 220/835 |
| 4,223,421 A * | 9/1980 | Wassenaar | | 16/267 |
| 4,259,811 A * | 4/1981 | Davis | | 49/356 |
| 4,479,675 A * | 10/1984 | Zankl | | 296/37.16 |
| 4,493,417 A * | 1/1985 | Ackeret | | 206/387.13 |
| 4,532,673 A * | 8/1985 | Kim | | 16/233 |
| 4,589,567 A * | 5/1986 | Pircher | | 220/326 |
| 4,598,889 A * | 7/1986 | Remington | | 244/87 |
| 4,893,850 A * | 1/1990 | Mizusawa | | 292/128 |
| 4,985,962 A * | 1/1991 | Weber | | 16/232 |
| 5,067,625 A * | 11/1991 | Numata | | 220/827 |
| 5,070,577 A * | 12/1991 | Bonneville et al. | | 16/260 |
| 5,076,641 A * | 12/1991 | Lindberg | | 297/188.19 |
| 5,144,720 A * | 9/1992 | Aihara et al. | | 16/232 |
| 5,173,992 A * | 12/1992 | Aihara et al. | | 16/232 |
| 5,195,272 A * | 3/1993 | Yamada | | 49/193 |
| 5,210,906 A * | 5/1993 | Aihara et al. | | 16/232 |
| 5,212,849 A * | 5/1993 | Aihara | | 16/232 |
| 5,337,911 A * | 8/1994 | Holub | | 220/254.3 |
| 5,357,652 A * | 10/1994 | Yamada | | 16/232 |
| 5,433,039 A * | 7/1995 | Hawkins et al. | | 49/382 |
| 5,455,987 A * | 10/1995 | Svehaug | | 16/267 |
| 5,530,992 A * | 7/1996 | Baermann | | 16/231 |
| 5,562,049 A * | 10/1996 | Hoffman et al. | | 108/94 |
| 5,647,652 A * | 7/1997 | Zalewski et al. | | 312/324 |
| 5,651,164 A * | 7/1997 | DeMarco | | 16/230 |
| 5,675,934 A * | 10/1997 | Park | | 49/193 |
| 5,829,196 A * | 11/1998 | Maier | | 49/181 |
| 5,853,220 A * | 12/1998 | Gulich et al. | | 297/188.16 |
| 5,863,089 A * | 1/1999 | Ignarra et al. | | 296/37.8 |
| 5,926,916 A * | 7/1999 | Lee et al. | | 16/230 |
| 5,931,336 A * | 8/1999 | Takeuchi | | 220/836 |
| 6,003,716 A * | 12/1999 | Allison et al. | | 220/326 |
| 6,116,674 A * | 9/2000 | Allison et al. | | 296/37.8 |
| 6,129,400 A * | 10/2000 | Jakubiec et al. | | 296/37.14 |
| 6,142,333 A * | 11/2000 | Sasamoto et al. | | 220/264 |
| 6,170,723 B1 * | 1/2001 | Howell | | 224/404 |
| 6,176,746 B1 * | 1/2001 | Morello et al. | | 439/718 |
| 6,250,729 B1 * | 6/2001 | Allison et al. | | 312/324 |
| 6,363,576 B1 * | 4/2002 | Hsu et al. | | 16/239 |
| 6,399,882 B1 * | 6/2002 | Faulkner et al. | | 174/99 B |
| 6,442,896 B1 * | 9/2002 | Chapin, III | | 49/193 |
| 6,616,205 B2 * | 9/2003 | Bruhnke et al. | | 296/37.8 |
| 6,644,526 B2 * | 11/2003 | Pegorier | | 224/539 |
| 6,682,116 B1 * | 1/2004 | Okumura | | 296/37.8 |
| 6,733,096 B2 * | 5/2004 | Bae | | 312/324 |
| 6,742,823 B2 * | 6/2004 | Guanzon et al. | | 296/37.16 |
| 6,761,278 B2 * | 7/2004 | Hyp et al. | | 220/254.2 |
| 6,761,388 B2 * | 7/2004 | Lein et al. | | 296/24.34 |
| 6,901,632 B2 * | 6/2005 | Boyce | | 16/231 |
| 7,147,259 B2 * | 12/2006 | Radu et al. | | 296/24.34 |
| 7,192,070 B2 * | 3/2007 | Radu et al. | | 296/24.34 |
| 7,431,365 B2 * | 10/2008 | Sturt et al. | | 296/24.34 |
| 7,520,552 B2 * | 4/2009 | Nakamura et al. | | 296/24.34 |
| 7,686,364 B2 * | 3/2010 | Hehn | | 296/24.34 |
| 7,810,862 B2 * | 10/2010 | Smith | | 296/24.34 |
| 7,922,228 B2 * | 4/2011 | Spitler et al. | | 296/24.34 |
| 8,100,453 B2 * | 1/2012 | Shimajiri | | 296/37.8 |
| 8,523,260 B2 * | 9/2013 | Spitler et al. | | 296/37.8 |
| 2001/0030436 A1 * | 10/2001 | Kifer et al. | | 296/24.1 |
| 2002/0163215 A1 * | 11/2002 | Emerling et al. | | 296/24.1 |
| 2009/0072565 A1 * | 3/2009 | Mayne, Jr. | | 296/24.34 |
| 2013/0270286 A1 * | 10/2013 | Fukui | | 220/811 |
| 2014/0361567 A1 * | 12/2014 | Singh | | 296/37.8 |

FOREIGN PATENT DOCUMENTS

| | | | | |
|---|---|---|---|---|
| DE | 10164340 C1 * | 10/2003 | | E05D 15/50 |
| DE | 10247453 A1 * | 4/2004 | | B60R 7/04 |
| DE | 102013204687 * | 10/2014 | | B60N 3/00 |
| FR | 2911554 A1 * | 7/2008 | | B60R 7/04 |
| GB | 2520400 A * | 5/2015 | | B60R 7/06 |
| JP | 57164821 A * | 10/1982 | | B60N 3/10 |
| JP | 03189249 A * | 8/1991 | | B60R 7/04 |
| JP | 05338496 A * | 12/1993 | | B60R 7/04 |
| WO | WO 2013066218 A1 * | 5/2013 | | B60N 3/08 |
| WO | WO 2013190561 A1 * | 12/2013 | | B60R 7/04 |

* cited by examiner

DUAL ACCESS VEHICLE STORAGE ASSEMBLY

CROSS-REFERENCE TO RELATED APPLICATIONS

This application claims the benefit of U.S. Provisional Patent Application No. 61/807,558, entitled "Dual Access Vehicle Storage Assembly," filed on Apr. 2, 2013.

BACKGROUND

1. Field of the Invention

This application relates to storage compartments, more specifically to vehicle consoles having lids.

2. Description of the Related Art

Vehicles typically include a storage space in a console between the front driver and passenger seats. In many vehicles, the console has a cover to protect the interior of the space or conceal items stored therein. In some cars, the storage space can have a rectangular perimeter at the top, though the storage space might have a different cross-sectional shape beneath the top perimeter. For this reason, it can sometimes be difficult to pass objects correctly-sized for the storage space through the top perimeter, particularly when the cover attachments can further narrow the perimeter. Some covers are comfortably padded on top to act as an armrest for the driver or passenger. Some covers instead have a flat surface, attempting to help the console storage lid match the typically smooth and featureless console of some vehicles.

Some console covers open by lifting the front of the cover, relative to the vehicle, to rotate the cover on hinges disposed at the rear of the cover. The hinges at the rear of the cover rotatably couple the cover to the console. When in an opened configuration, the cover is rotated upwards, to an approximately vertical position at the rear of the storage console. Thus, the storage compartment is difficult to access from the rear seats.

Additionally, some covers are constructed with hinges on the passenger side of the top perimeter, resulting in a console storage cover that is lifted by the driver on the driver's side, rotating the cover to a position that inhibits access to the storage space from the passenger side.

Attempts have been made to develop a storage console that can be opened from either side. However, these attempts have resulted in certain mechanisms that fail to operate smoothly and complex mechanisms which are difficult and expensive to manufacture and assemble.

Thus, there is a need for a console storage space cover that allows access without necessarily inhibiting access to a vehicle occupant in an open position. Additionally, a need exists for a cover which can permit objects to enter the storage space without constricting the opening. Additionally, a need exists for a simple, easy to manufacture mechanism that provides reliable access to a vehicle storage compartment.

SUMMARY OF THE INVENTION

In various embodiments, vehicle storage assemblies are described herein that can overcome the shortcomings of the prior art.

In some embodiments, a vehicle storage assembly can comprise a base, a first engagement rod, a second engagement rod, and a lid. The base defines a storage space. The base defines a first side and a second side. The first engagement rod is disposed along the first side of the base and defines a generally cylindrical first pivot surface. The first pivot surface defines an axis and at least one release surface recessed from the first pivot surface. The second engagement rod is disposed along the second side of the base and defines a generally cylindrical second pivot surface. The second pivot surface defines an axis and at least one release surface recessed from the second pivot surface. The lid comprises at least a first side and a second side. Each of said first side and said second side of the lid comprise at least one pivot defining a generally cylindrical pivot surface. Each of said pivots defines an opening which cooperates with said release surface of one of said engagement rods to permit said engagement rod to disengage from said pivot through said opening, so that the lid is disengageable from the first side of the base through rotation about the axis of the first engagement rod and disengageable from the second side of the base through rotation about the axis of the second pivot rod. In some embodiments, the release surface is configured such that the engagement rod is disengageable through the opening without bending said pivot. In some embodiments, the first side of said base and said second side of said base are parallel. In some embodiments, the lid is disengageable simultaneously from the first engagement rod and the second engagement rod.

In some embodiments, vehicle storage assembly comprises a base, a first engagement rod, a second engagement rod, and a cover. The base defines a storage space, a first side, and a second side. The first engagement rod is disposed along said first side of said base and defines a generally cylindrical first pivot surface defining an axis and at least one release surface recessed from said first pivot surface. The second engagement rod is disposed along said second side of said base and defines a generally cylindrical second pivot surface defining an axis and at least one release surface recessed from said second pivot surface. The cover comprises at least a first side and a second side. Each of said first side and said second side comprise at least one pivot defining a generally cylindrical second pivot surface. Each of said pivot defines an opening which cooperates with said release surface of one of said engagement rods to permit said engagement rod to disengage from said pivot through said opening, so that said cover is disengageable from said first side of said base through rotation about said axis of said first engagement rod and disengageable from said second side of said base through rotation about said axis of said second pivot rod.

In some embodiments, a storage compartment comprises a base, and a cover. The base comprises at least two engagement rods. The cover comprises a first latch, a first guide, a second latch, a second guide, and a lock mechanism. The first latch is configured to selectively engage one of the pluralities of engagement rods. The first guide is linearly displaced from the first latch and configured to rotatably couple to one of the plurality of engagement rods. The second latch is configured to selectively engage another of the plurality of engagement rods. The second guide is linearly displaced from the second latch and configured to rotatably couple the other of the plurality of engagement rods. The lock mechanism is configured to selectively engage both the first latch and the second latch.

DETAILED DESCRIPTION OF THE PREFERRED EMBODIMENT

Cover for a Vehicle Storage Assembly

FIGS. 1-5 illustrate an embodiment of a cover 10 for a vehicle storage space. The cover 10 can be mounted on an upper perimeter of a storage space. The cover 10 can comprise a base 30 and a lid 50. When positioned in a vehicle, the base 30 can be secured to the upper perimeter of the console storage space. For example, the base 30 can be secured with fasteners such as screws, tacks, rivets, secured with adhesive glue, epoxy, or tape, or secured through interference fit of mating features of the base 30 and storage console. The lid 50 can be coupled to the base 30. While the console is discussed in certain embodiments in the context of a storage console within an automobile, such as for example, a storage console between two seats in an automobile, in other embodiments, the cover 10 can be used in conjunction with other storage boxes for vehicles, such as, for example cargo boxes for pick-up trucks.

Base of the Cover

Figure 1:
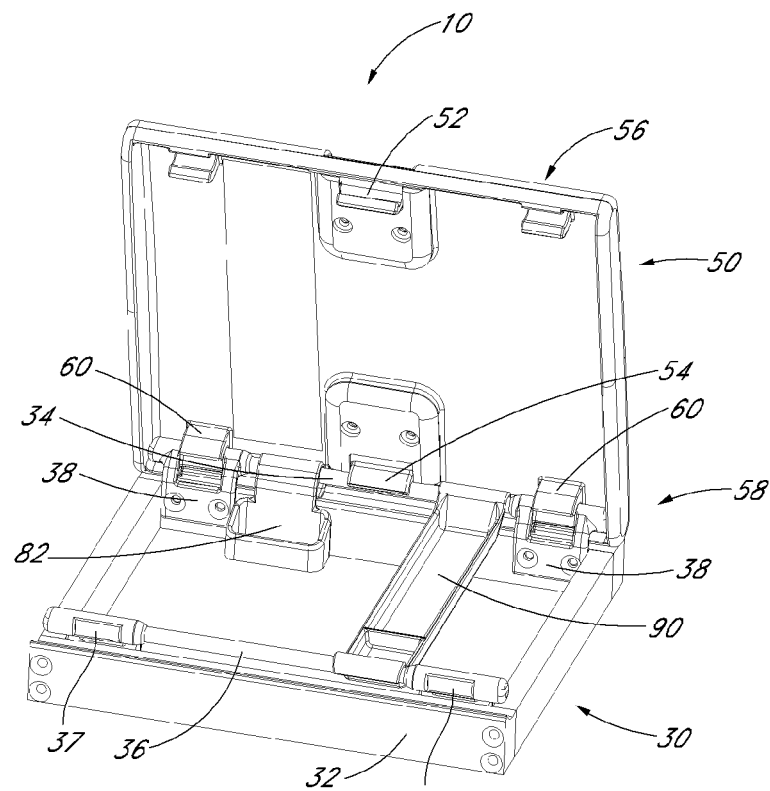
FIG. 1 illustrates a perspective view of an embodiment of a vehicle console storage cover.
Figure 2:
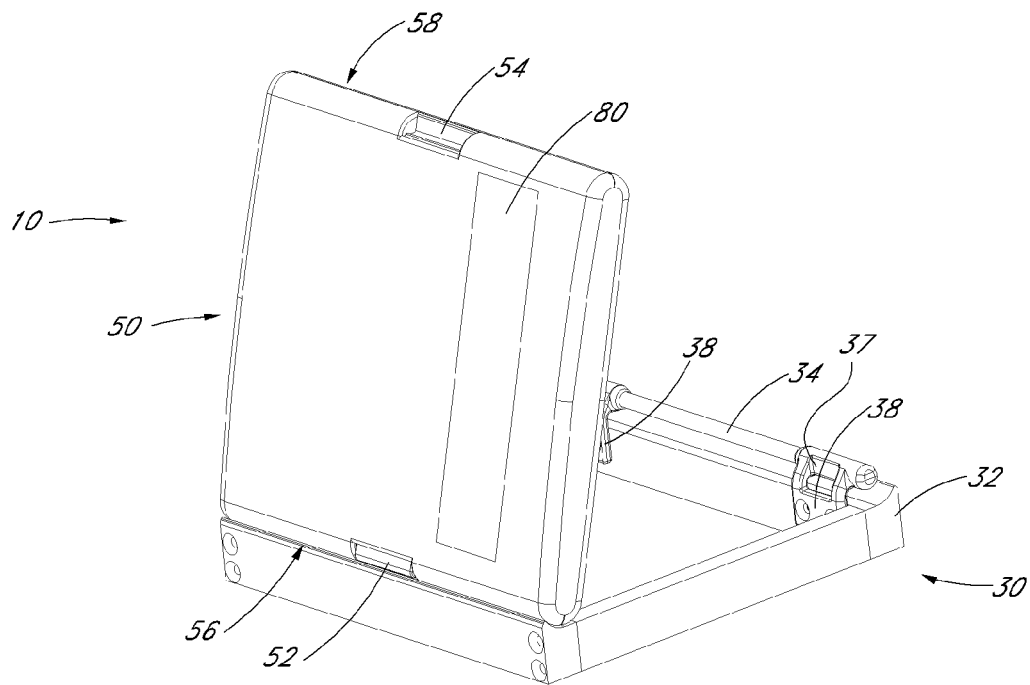
FIG. 2 illustrates a perspective view of the vehicle console storage cover of FIG. 1 from a reverse angle.
Figure 3:
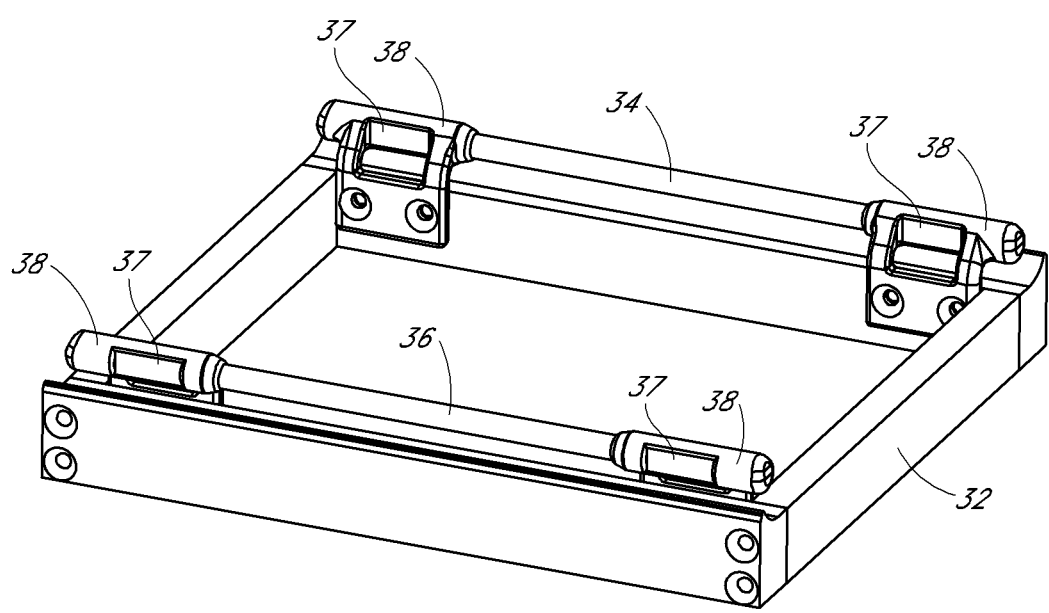
FIG. 3 illustrates an embodiment of a base of the vehicle console storage cover of FIG. 1.

With reference to FIGS. 1-3, the base 30 can comprise a support perimeter 32. In some embodiments, the support perimeter comprises a substantially rectangular frame. In some embodiments, the support perimeter 32 can comprise an assembly of four beams to form a rectangular frame. In other embodiments, the support perimeter 32 can comprise a unitary rectangular frame. While the illustrated embodiments include a generally rectangular support frame, in some embodiments, the support frame can have a different configuration, such as, for example, a trapezoidal shape. In some embodiments, the support perimeter 32 can be mountable to a vehicle storage console as noted above with respect to the base 30. In other embodiments, the support perimeter can be integrally formed with the storage console. In about the opening to the storage space of whatever material is used for the console. In some embodiments, the support perimeter 32 can be shaped separately from any appropriate material, such as a plastic, wood, metal, composite, or ceramic.

With continued reference to FIGS. 1-3, the base 30 can include a plurality of mounting rods 34, 36. For example, in the illustrated embodiment, the base 30 comprises a first mounting rod 34 and a second mounting rod 36. In some embodiments, the mounting rods can be coupled to the support perimeter 32, such as with brackets 38. In some embodiments, the mounting rods 34, 36 can be supported by integrally-formed portions of the perimeter 32 configured to receive the mounting rods 34, 36. In other embodiments, the mounting rods can be integrally formed with the support perimeter 32. In some embodiments, the mounting rods 34, 36 can be constructed of a metal or metal alloy. In other embodiments, the mounting rods 34, 36 can be constructed of other materials, including without limitation, plastic materials, polymeric materials, composites, or ceramics. Desirably, the mounting rods 34, 36 can comprise a material having a relatively low coefficient of friction. Thus, it can be desirable for metallic mounting rods 34, 36 to have a relatively smooth surface finish over at least a portion of the rods 34, 36.

With continued reference to FIGS. 1-3, the mounting rods 34, 36 can define axes of rotation of the lid 50 of the vehicle storage console cover 10. In the illustrated embodiment, the mounting rods 34, 36 are disposed along the lateral sides of the perimeter 32. Thus, as further described below, the lid 50 can be opened from either side, allowing easy access to an interior space of the storage compartment by the driver, front seat passenger, or rear seat passengers.

With continued reference to FIGS. 1-3, in the illustrated embodiment, the rods 34, 36 are sized to extend along substantially the entire lengths of lateral sides of the perimeter 32. In other embodiments, the rods can be placed as smaller separate rod segments positioned at particular locations along the lateral sides.

Lid of the Vehicle Console Cover

Figure 4:
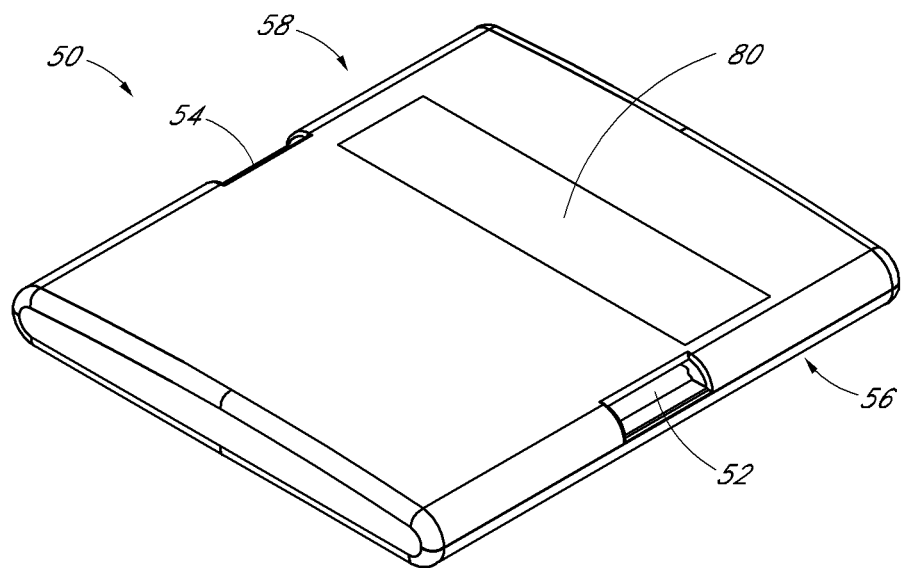
FIG. 4 illustrates a perspective view of a top side of an embodiment of a lid of the vehicle console storage cover of FIG. 1.
Figure 5:
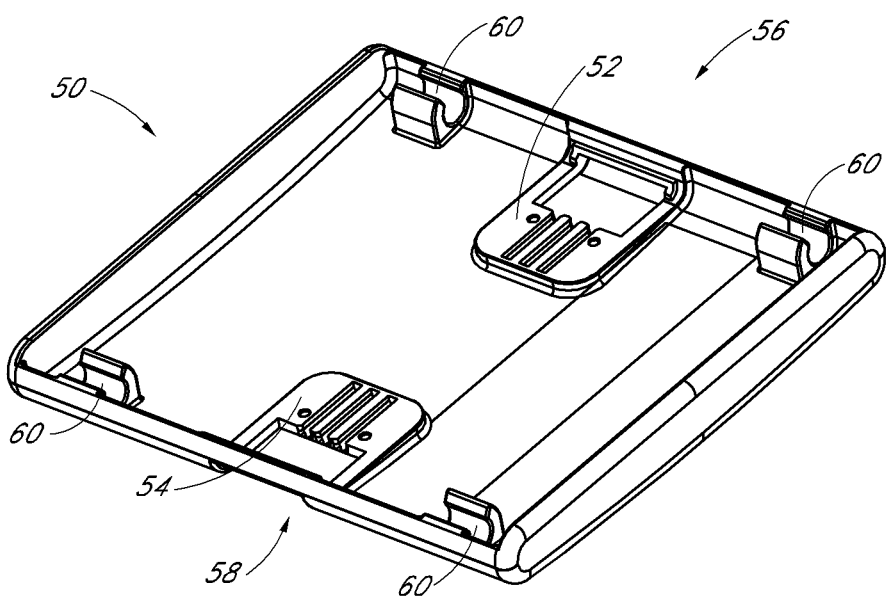
FIG. 5 illustrates a perspective view of the bottom of the lid of FIG. 4.

With reference to FIGS. 4-5 one embodiment of a lid 50 for the vehicle console cover 10 is illustrated. As can be seen in the illustrated embodiment, the lid 50 can have a substantially rectangular shape. In some embodiments, the lid 50 can be a generally rectangular shape having slightly curved sides. In other embodiments, the lid 50 can have other geometric configurations, such as, for example, a generally trapezoidal shape.

With continued reference to FIGS. 4-5, in some embodiments, the lid 50 can be formed to have a recessed surface underside, as in the illustrated embodiment. In other embodiments, the lid 50 can present a substantially uniform surface on each side. In some embodiments, an upper surface of the lid can be curved or contoured. Such a curved or contoured surface can be desirable for use as an armrest.

In some embodiments, the lid 50 can be upholstered or otherwise covered with a fabric, leather, vinyl, or other covering. In some embodiments, the lid 50 can include foam or other padding to form a cushion. The lid 50 can desirably be covered a material that coordinates with the upholstery of a vehicle.

In certain embodiments, the lid 50 can have accessories integrated therewith. For example, in some embodiments, one or more cup holders can be formed in the lid. In other embodiments, electronic accessories, such as a speakerphone device with an attachment for a mobile phone or calculator can be integrated into the lid 50.

With reference to FIGS. 4-5, the lid 50 can comprise one or more rotation members 60 along the underside. The rotation members 60 can be integrally formed with the lid 50. In other embodiments, the rotation members 60 can be mounted to the lid 50. In the illustrated embodiment, the rotation members 60 extend downward from a lower surface of the lid 50. The rotation members can be shaped to receive a portion of the mounting rod 34, 36 such that the lid 50 can be removably coupled to the mounting rods 34, 36. The rotation members 60 can desirably be configured to rotatably couple the lid 50 to the mounting rods, such that the mounting rods 34, 36 each define an axis of rotation of the lid 50 with respect to the base 30 of the storage console cover 10.

With reference to FIGS. 1 and 2, in the illustrated embodiment, the rotation members 60 can be shaped to partially encircle a mounting rod 34, 36. Each rotation member 60 can have an opening sized to permit the mounting rods 34, 36 to couple and decouple from the rotation members 60. In some embodiments, the rotation members 60 and mounting rods 34, 36 are configured such that the rotation members can only decouple from the mounting rods in a particular relative rotational position. For example, in the illustrated embodiment, portions of the mounting rods 34, 36, for example, the brackets 38, where the rotation members 60 couple and decouple are substantially cylindrical with a flat surface 37 oriented vertically with respect to the base 30. The flat surfaces 37 are recessed from the projection of the generally cylindrical surface of the mounting rods 34, 36 and brackets 38. Thus, when the lid 50 is in a closed position, either side of the lid 50 can be raised, separating rotation members from one of the mounting rods 34, 36. In the illustrated embodiment, as one side is lifted, the rotation members 60 on the opposite side will rotate from the flat surface of the mounting rod 34, 36 onto the substantially cylindrical portion, and are no longer releasable from the mounting rod 34, 36. Accordingly, once the lid is initially opened, one lateral edge of the lid can be securely retained by a mounting rod.

With continued reference to FIGS. 4-5, the lid 50 can further comprise one or more latches 52, 54. In the illustrated embodiment, the latches are disposed along the lateral sides of the lid 50 such that the lid 50 can be opened from either side. The latches 52, 54 can be configured to selectively engage the mounting rods 34, 36 to selectively secure a side of the lid 50 to the base 30. For example, when the lid 50 is in a closed position, both latches 52, 54 can engage a corresponding mounting rod 34, 36. When a user desires to open the lid 50, the user can release one latch 52, by, for example, depressing a catch member to release the latch 52 from the mounting rod 36. The user can then pivot the lid 50 about the opposite latch 54 and rotation members 60 with respect to the base 30 on a mounting rod 34. The lid 50 can be opened from either side by selecting a latch 52, 54 to open. The latches 52, 54 are desirably biased, such as with springs or flexible biasing members, to engage the mounting rods 34, 36. Accordingly, in certain embodiments, the lid 50 can only be opened once a latch 52, 54 is released by overcoming the bias.

The latches 52, 54 can be of any type suitable to engage the mounting rod 34, 36 or a portion of a mounting rod 34, 36. In some embodiments, the latches 52, 54 do not couple directly to the mounting rod 34, 36 or portion thereof, but engage a portion of the perimeter 32 appropriately shaped to receive the latch 52, 54.

The lid 50 can be rotated open once a latch 52, 54 is released. The lid 50 can rotate about either mounting rod 34 or 36 at the location of the rotation members 60 and one of the latches 52, 54. Accordingly, when the first latch 52 is released, the lid 50 can be rotated open around the first mounting rod 34, as shown in FIG. 1. As shown in the illustrated embodiment, the first lateral side 56 of the lid 50 containing the first latch 52 can be raised, thus allowing access to the storage compartment by a user. As shown in FIG. 2, the second latch 54, disposed in the second lateral side 58 of the lid 50 can be released, and the lid rotated around the second mounting rod 36. Thus, either lateral side 56, 58 of the lid 50 can be opened, allowing access to the console storage space from either the driver or passenger side of a vehicle. Additionally, in the illustrated embodiment, the lid 50 is not rotated towards the back of the vehicle. Thus, advantageously access from the rear seats to the storage space is not inhibited.

In some embodiments, the lid 50 can be completely removed from the base 30 by decoupling the latches 52, 54 from the mounting rods 34, 36. For example, from the closed position, both latches 52, 54 can be released and the lid moved upwards away from the perimeter 32. Advantageously, with the lid 50 removed, a user can use the storage console to store oversized items or can have enhanced access to clean the storage console, base 30, and lid 50. The rotation members 60 and the rods 34, 36 can be shaped to allow the rods 34, 36 to decouple from the encircling portion of the members 60 when the lid 50 is positioned level across the base 30. For example, the rods 34, 36 can include flat surfaces 37 that are recessed from the projection of the generally cylindrical surface to allow the rotation members 60 to decouple at certain orientations (see FIG. 18). Thus, from a closed position, the lid 50 can be completely decoupled from the base 30 by disengaging the latches 52, 54 and lifting upwards.

With reference to FIGS. 2 and 4, in some embodiments, the lid 50 can include at least one substantially flat surface 80. The flat surface 80 can occupy a portion of the lid 50 top, as shown in the illustrated embodiment, or the entire lid 50 can have a flat surface, (as shown in the embodiment illustrated in FIGS. 6 and 7). When decoupled from the base 30, the lid 50 can desirably serve various functions including a writing tablet or as a flat surface for supporting objects.

In some embodiments, a portion of the lid 50 can be detached from the lid. In some embodiments, the detachable portion can include an accessory, such as a microphone or speakerphone portion for use with a mobile phone.

While the embodiment of vehicle storage console cover 10 illustrated in FIGS. 1-5 depicts a lid having two axes of rotation, each generally parallel to a lateral edge of the lid 50, other embodiments can have other opening configurations. For example, in other embodiments, additional mounting rods can be mounted along the front and/or rear sides of the perimeter 32, and additional latches disposed in the lid 50, permitting the lid 50 to be disengaged from any of the mounting rods and rotated about an opposite mounting rod. Accordingly, the lid 50 can be rotated around any of the four sides of perimeter 32, and the storage space can be easily accessed from any location in the vehicle. In some embodiments, the mounting rods can be located on at least two adjacent sides of the base 30 rather than on opposing sides of the perimeter 32 (as illustrated in FIGS. 1-5). In these embodiments, the configuration of mounting rods permits the lid 50 to be opened in at least two directions, ninety degrees apart. In one non-limiting example, the lid 50 can be adapted to open from a vehicle's driver's side of the console and the front of the console. In some embodiments, the mounting rods are positioned such that the lid 50 can be opened from any of three directions. In one non-limiting example, the lid 50 can be opened from a vehicle's driver's side, passenger side, and the front side. It may be desirable, in some embodiments of console cover, that one or more latches engage the perimeter 32 of the base 30 rather than a mounting rod. For example, a console cover as described above which can be opened from any of three directions can include three mounting rods. In this embodiment, a latch opposite one of the mounting rods does not have an underlying mounting rod to engage, and can be configured to engage the support perimeter.

Figure 6:
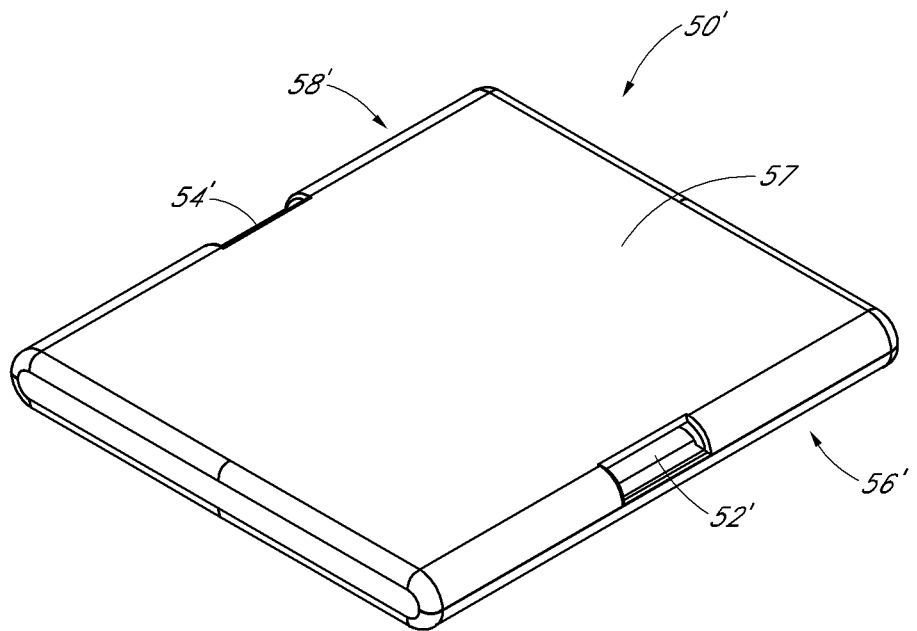
FIG. 6 illustrates perspective view of a top side of an embodiment of a lid of a vehicle console storage cover.
Figure 7:
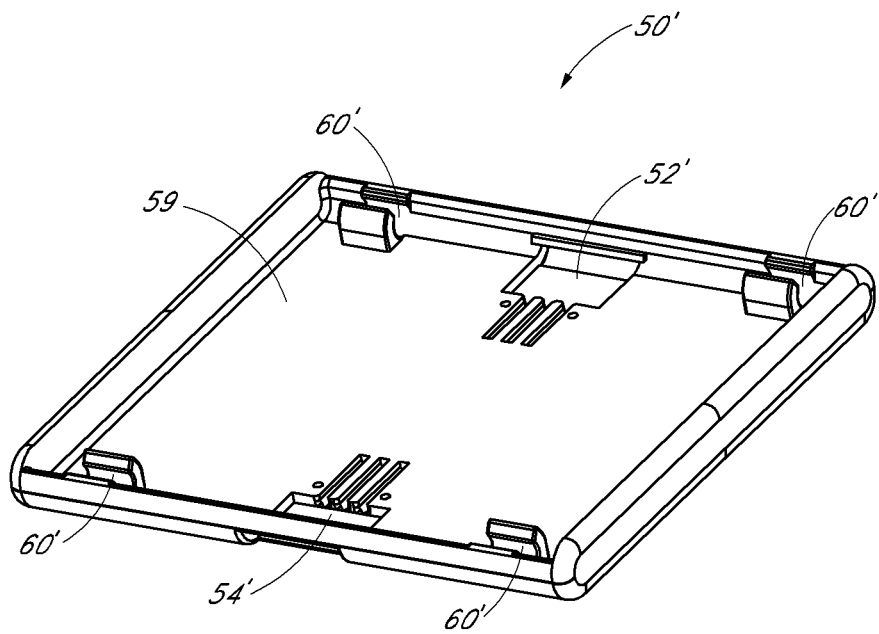
FIG. 7 illustrates a perspective view of the bottom of the lid of FIG. 6.

Another embodiment of the lid 50' is shown in FIGS. 6 and 7. Except for prime marks ('), the component numerals refer to similar components as those described in FIGS. 1-5. As can be seen, the lid 50' can be shaped to have a flat surface 57 across a large portion of the upper side. In some embodiments, the flat surface 57 can be a solid portion, and the lid 50' can have a flat underside 59 as well. In those embodiments where padding or other fabric are attached to at least a portion of the top of the lid 50', the flat underside 59 can be used when the lid 50' is detached from the base 30 for those functions in which the flat surface 57 might otherwise be used.

Figure 8:
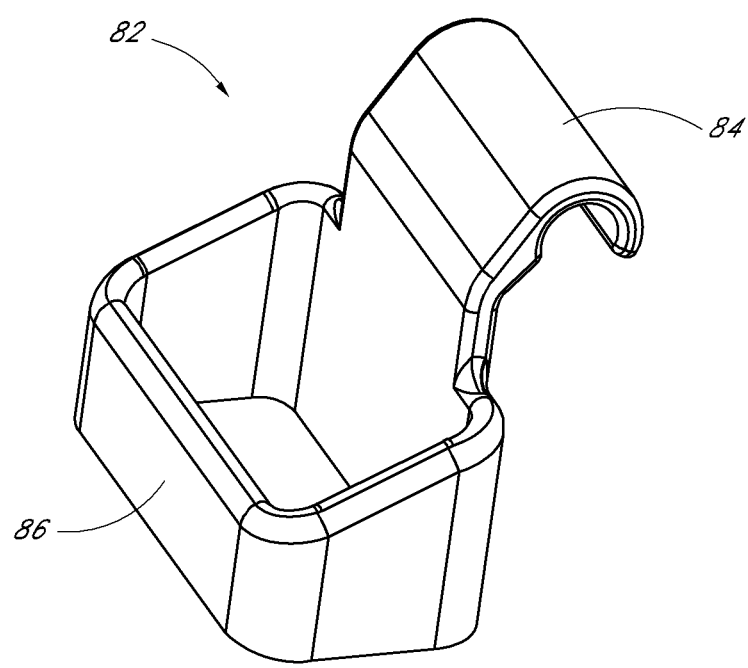
FIG. 8 illustrates a perspective view of an embodiment of an accessory holder.
Figure 9:
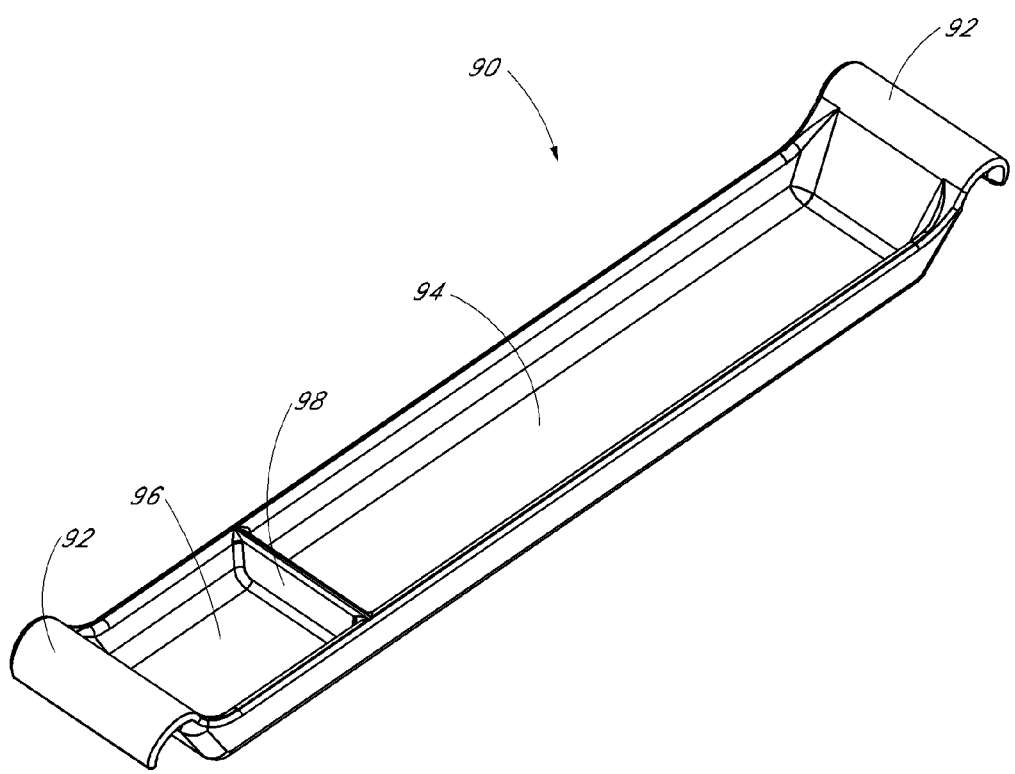
FIG. 9 illustrates a perspective view of an embodiment of bridging tray.

With reference to FIGS. 1, 8, and 9, additional components, such as an accessory clip 82 or bridging tray 90 can be disposed in the cover 10. The clip 82 can be mounted on a rod 34, 36. Similarly, the bridging tray 90 can be coupled with at least one mounting rod 34, 36.

As shown in FIG. 8, an embodiment of the accessory clip 82 can include a hook member 84 shaped to couple with a mounting rod 34, 36. The hook member 84 can have an interference fit, permitting the clip 82 to remain engaged with the rod 34, 36 once attached. Additionally, the hook member 84 can be shaped similar to the rotation member 60, permitting the clip 82 to rotate around the mounting rod 34, 36.

The hook member 84 can support a holster or clip support member 86. In some embodiments, the support member 86 can be adapted to receive, for example, a portable electronic device such as a mobile phone, a mobile email device, a PDA, or a portable music player. In other non-limiting examples, the accessory clip 82 can be adapted to receive one or more writing instruments or a disposable tissue dispenser. Advantageously, one or more accessory clips 82 can be positioned in various locations in the storage console cover 10, allowing the storage console to be used efficiently to store various items.

FIG. 9 illustrates an embodiment of a bridging tray 90. The tray 90 can have engagement members 92 to releasably engage the mounting rods 34, 36, as shown in FIG. 1. The engagement members 92 can be similar to the rotation members 60, permitting them to be of an appropriate shape to engage a mounting rod 34, 36. Accordingly, the tray 90 can be disposed across the interior of the cover 10, spanning between the first mounting rod 34 to the second mounting rod 36. The engagement members 92 can be releasably coupled to mounting rods 34, 36, allowing for repositioning of or removal of the tray 90 if desired. The tray 90 can comprise at least one storage portion 94. The storage portion 94 can be at least partially surrounded by the walls of the tray 90, inhibiting items placed in the tray 90 from falling into the storage space below. In some embodiments, a second storage portion 96 can created when a partition 98 is formed in the tray 90. In some embodiments, the partition 98 can be removable, desirably allowing the tray to be selectively configured to have a single relatively large storage portion or two smaller storage portions.

Vehicle Console Cover with Locking Lid

Figure 10:
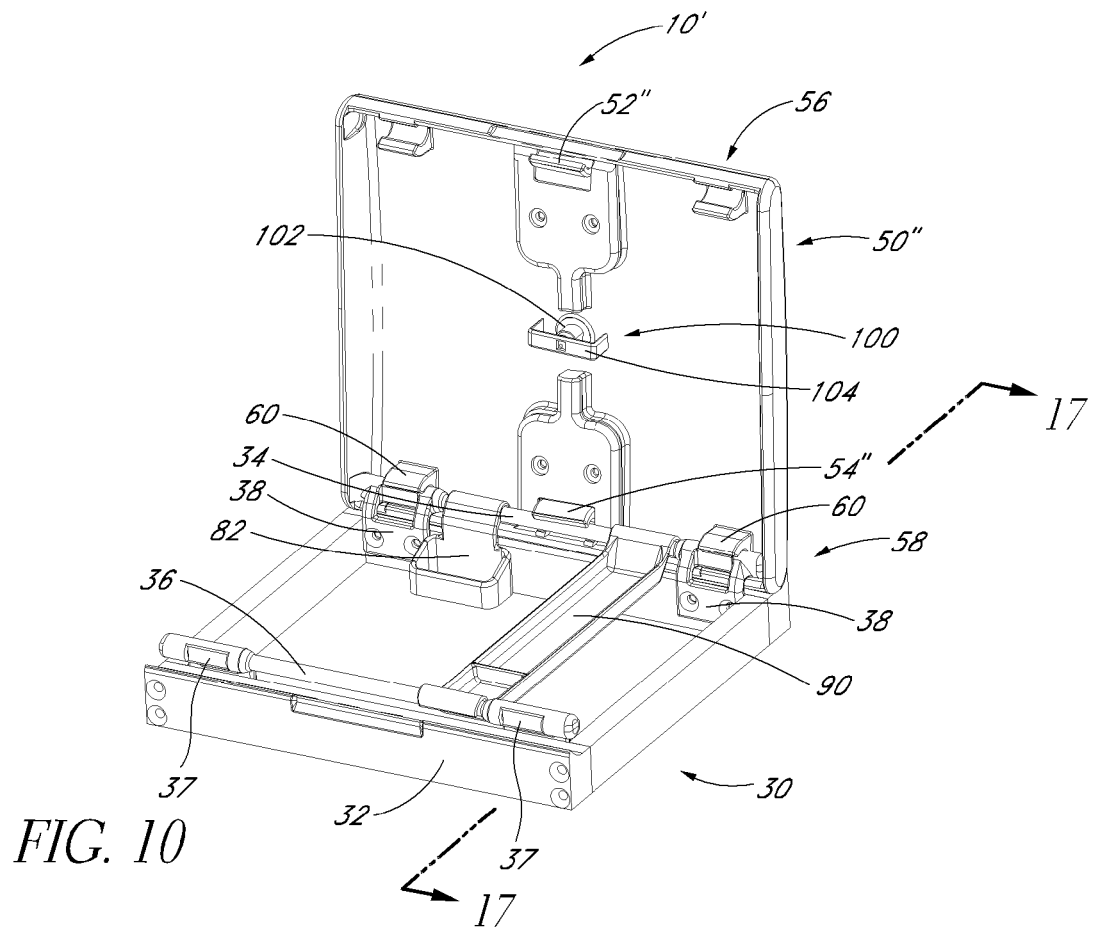
FIG. 10 illustrates a perspective view of another embodiment of a vehicle console storage cover.
Figure 11:
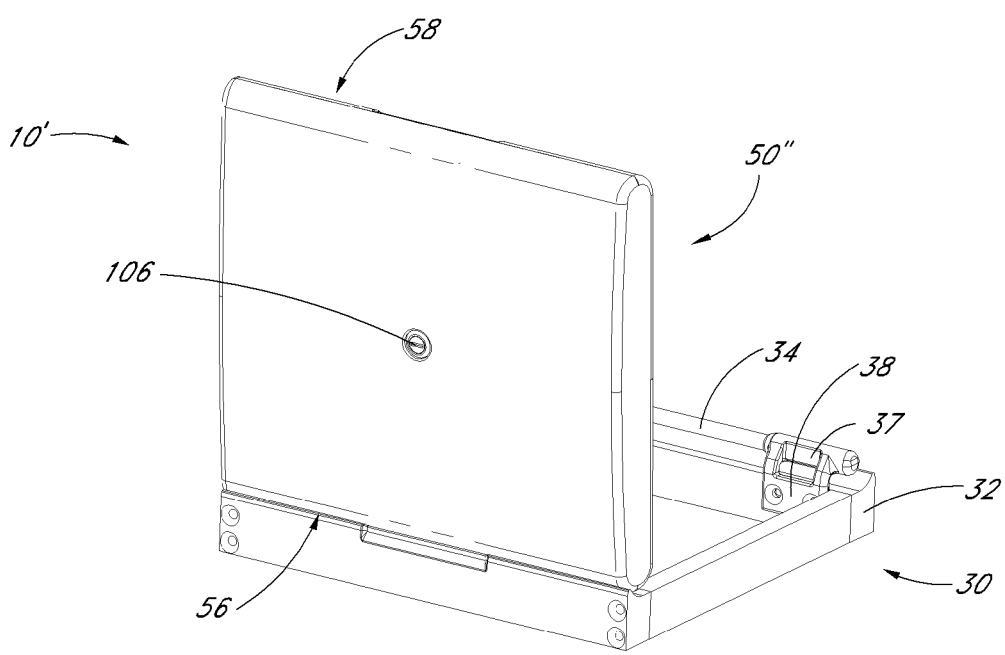
FIG. 11 illustrates a perspective view of the vehicle console storage cover of FIG. 10 from a reverse angle.
Figure 12:
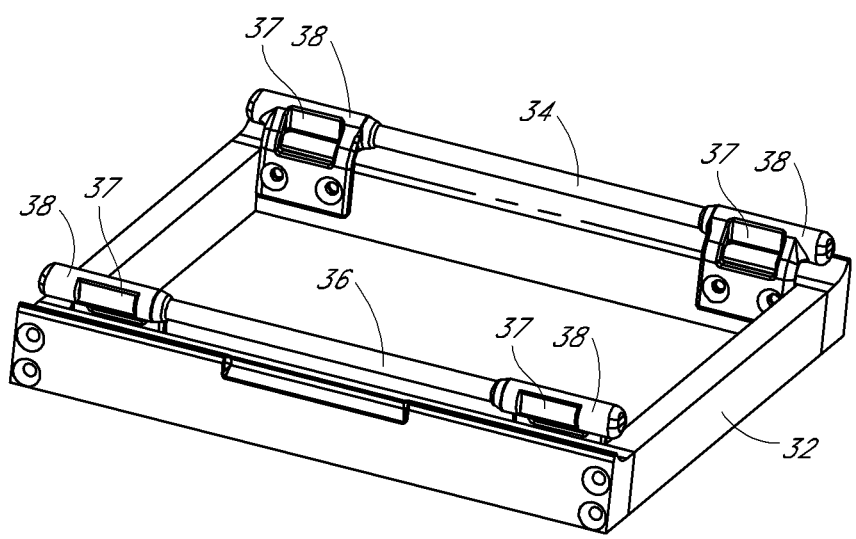
FIG. 12 illustrates an embodiment of a base of the vehicle console storage cover of FIG. 10.
Figure 13:
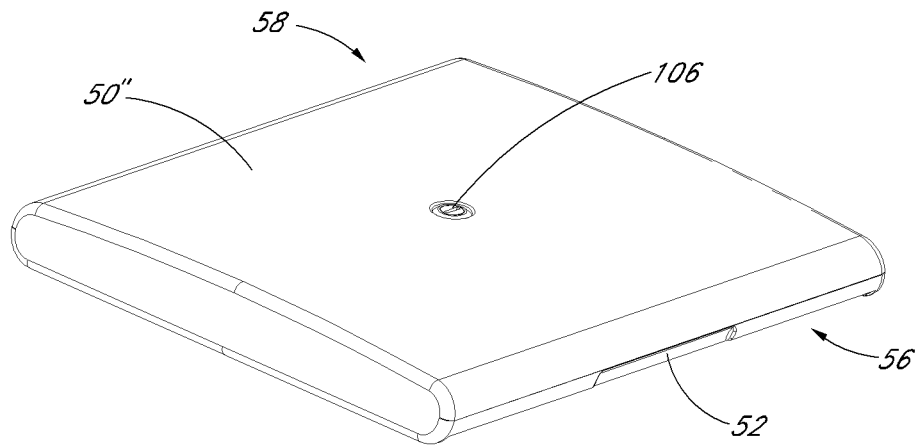
FIG. 13 illustrates a perspective view of a top side of an embodiment of a lid of the vehicle console storage cover of FIG. 10.
Figure 14:
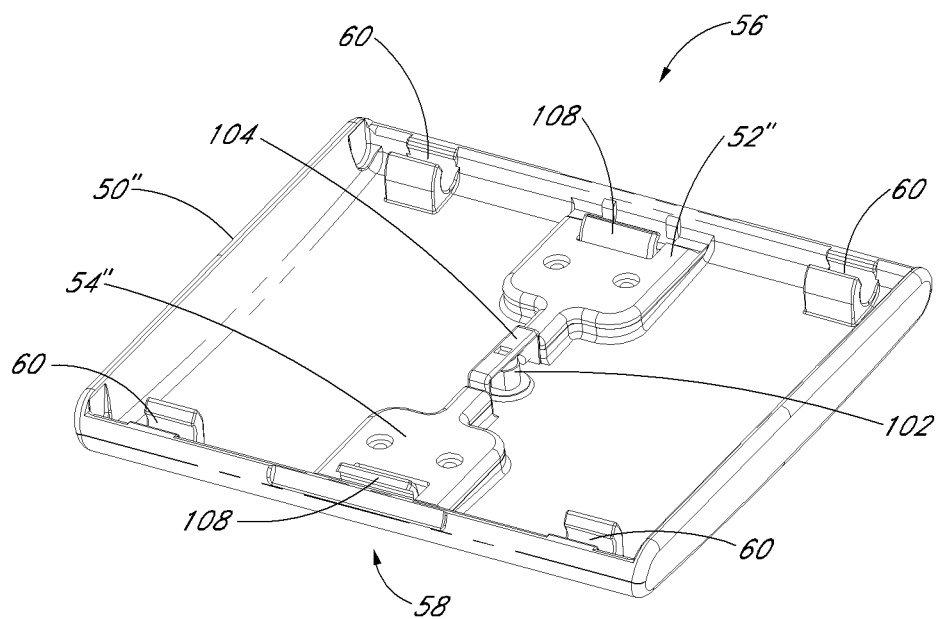
FIG. 14 illustrates a perspective view of the bottom of the lid of FIG. 13.

With reference to FIGS. 10-19, an embodiment of dual access vehicle console cover with a locking lid is illustrated. FIGS. 10-18 illustrate an embodiment of a cover 10' for a vehicle console storage space. The cover 10' can be mounted on an upper perimeter of a storage space. The cover 10' can be similar to the embodiment of cover 10 illustrated in FIGS. 1-5, but include a lock mechanism 100. The cover 10' can comprise a base 30 and a lid 50". When positioned in a vehicle, the base 30 can be secured to the upper perimeter of the console storage space. For example, the base 30 can be secured with fasteners such as screws, tacks, rivets, secured with adhesive glue, epoxy, or tape, or secured through interference fit of mating features of the base 30 and storage console. The lid 50" can be coupled to the base 30. With reference to FIGS. 10-12, the base 30 can be substantially similar to the base 30 described above with reference to the embodiment of FIGS. 1-5. In other embodiments, a cover 10' with a locking lid 50" can have a base with a different configuration. For example, other shapes or heights of base can be used with a locking lid 50".

With reference to FIGS. 10-11 and 13-16, the lid 50" can include a locking mechanism 100 that can be configured to actuate both latches 52", 54". Advantageously, a locking lid for a vehicle storage console can provide additional security for items stored in a vehicle's storage console. In addition, a locking console cover can be desirable for a storage console such as a pick-up truck bed cargo box. In the illustrated embodiment, the lock mechanism 100 can be configured to lock and unlock both latches 52", 54" simultaneously. In other embodiments, the lock mechanism 100 can be configured to selectively unlock one of the latches 52", 54", thus allowing the dual access console cover 10' to be locked into a single axis operation mode. In other embodiments, each latch 52, 52', 54, 54' (FIGS. 1-2, 4-7) can include a lock mechanism that can include none, some, or all of the aspects described herein with respect to the illustrated lock mechanism 100.

With continued reference to FIGS. 10-11 and 13-16, in the illustrated embodiment, the lock mechanism 100 comprises a lock cylinder 102 and an actuation member 104. A key receiving unit 106 can be coupled to the lock cylinder 102. The lock can be configured such that when a key is inserted into the key receiving unit 106, the key can be rotated to rotate the lock cylinder 102. The lock cylinder 102 is coupled to the actuation member 104, which is likewise rotated as the lock cylinder 102 is rotated. As illustrated, the actuation member 104 has a substantially U shape comprising a base portion to which the lock cylinder is coupled and two lateral extensions. As the lock cylinder is rotated, the actuation member can be rotated between a locked position in which the lateral extensions are oriented towards the lateral edges of the lid 50" (see, e.g., FIG. 15) and an unlocked position in which the lateral extensions are oriented substantially longitudinally with respect to a central longitudinal axis of the lid 50". In the illustrated embodiment, the lock mechanism 100 can be a pin-tumbler lock such that insertion of a properly-cut key into the key receiving unit 106 rotationally frees the lock cylinder 102. In other embodiments, other types of lock mechanism can be used, including other mechanical locks or electronically actuated locks.

Figure 15:
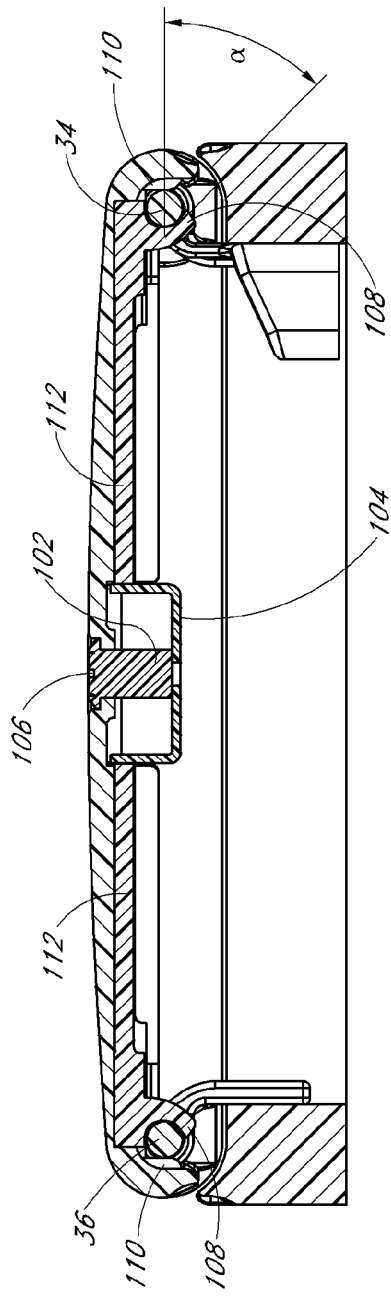
FIG. 15 illustrates a cross-sectional view of the lid of FIG. 13 with the lock in a locked position.

With continued reference to FIGS. 10-11 and 13-16, the lock mechanism 100 can be rotated to a locked position (FIG. 15) in which both latches 52", 24" are latched about the mounting rods 34, 36 to prevent the lid 50" from rotating about either axis. As illustrated in FIG. 15, in the locked position, the actuation member 104 is positioned such that the lateral extensions are oriented towards lateral edges of the lid 50". Rotation of the lateral extensions into this outward orientation advances retention members 108 over the mounting rods 34, 36 of the base 30. The lock mechanism 100 can further comprise pushrods 112 to couple the actuation member 104 to the retention members 108. In some embodiments, the pushrods 112 can be integrally formed with the retention members 108, for example, by a molding process. In other embodiments, the pushrods 112 can be separate from the retention members 108 and can be formed of different materials.

With reference to FIG. 15, with the lock mechanism 100 in the locked position, the retention members 108 are positioned at least partially around the mounting rods 34, 36, and interfere with rotation of the lid 50" about either of the rotational axes. Desirably, the retention members 108 are configured to extend sufficiently around the mounting rods 34, 36 in a locked position to prevent undesired opening of the lid 50", but are retractable from the mounting rods 34, 36 in an open position to allow easy opening of the lid 50". Also, desirably, the retention members 108 are configured to allow locking of the lid 50" even when the lid may be slightly open or out of alignment with the base 30.

Figure 16:
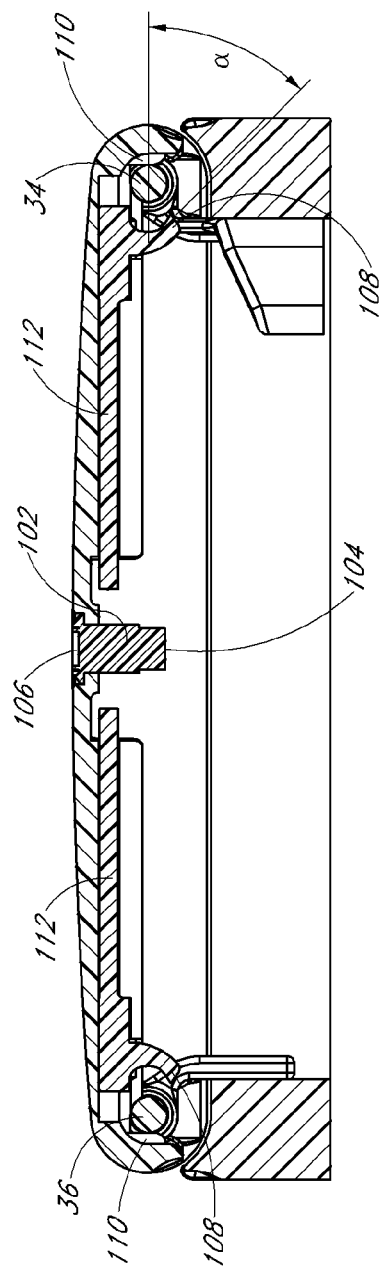
FIG. 16 illustrates a cross-sectional view of the lid of FIG. 13 with the lock in an unlocked position.

With reference to FIGS. 15-16, in some embodiments, an angle, a formed between a plane of the lid 50" and the retention member 108 can be between approximately 15-65 degrees, desirably, the angle, a can be between 24 and 45 degrees, more desirably, between 30-40 degrees. While various configurations of retention members 108 are discussed herein in the context of a locking lid 50", it is contemplated that the geometries and configurations discussed with respect to these embodiments can be used in latches 52, 52', 54, 54' as discussed herein with respect to other embodiments of lid 50, 50'.

To provide additional security to the lock mechanism 100, the lid 50" can comprise at least one rod support 110 positioned adjacent one of the latches 52", 54" to prevent the mounting rods 34, 36 from flexing or bowing if an attempt is made to open the lid 50" when the storage console cover 10' is locked. In some embodiments, the rod support 110 can comprise a protrusion that is integrally formed with the lid 50", such as by molding. In other embodiments, the rod support 110 can be coupled to the lid 50" such as by a fastener, welding operation, or adhesive, and can be constructed of a different material than the lid 50".

With reference to FIG. 16, the lid 50" is illustrated with the lock cylinder 102 rotated into an unlocked position. As illustrated, rotating the lock cylinder 102 rotates the actuation member 104 into an unlocked position such that the lateral extensions thereof are positioned substantially longitudinally with respect to a central longitudinal axis of the lid 50". Desirably, the lock mechanism can include a biasing member such as a spring to bias the retention members 108 and pushrods 112 into the unlocked position such that the retention members retract from the mounting rods 34, 36 when the lock mechanism is unlocked. Once the retention members 108 have been withdrawn from the mounting rods 34, 36, either side of the lid 50" can be lifted to open the lid about an axis.

Advantageously, the lid 50" illustrated in FIGS. 10-16 can be opened from either side from the unlocked position. With the lock mechanism 100 in an unlocked position, the lid 50" can be opened without the user releasing an additional latch. Thus, a user could leave the lid 50" in an unlocked configuration and easily access contents of the storage console from either side without having to operate a latch mechanism. This ease of access can enhance the convenience of this storage console cover 10' to a user. Also, since the lid 50" can be operated without the use of user operable latches on each side, the lid can have a sleek, contoured, aesthetically pleasing profile.

The lock mechanism can be configured to operate with a minimum of binding or sticking. Desirably, the lateral extensions of the actuation member 104 can include beveled, angled, or radiused edges such that when rotating the actuation member 104, it smoothly engages the pushrods 112 without binding the extension or retraction of the retention members 108 as the lock mechanism is locked or unlocked. In the illustrated embodiments, the actuation member 104 has radiused edges (see FIGS. 10, 14). In other embodiments, other configurations of actuation member 104 can reduce the risk of binding, or the pushrod 112 can be configured with radiused edges to reduce binding. In some embodiments, the retention members 108, pushrods 112, and biasing members can be enclosed within a housing (FIG. 14) such that contents of the storage console do not interfere with operation of the lock mechanism. In some embodiments, the lock mechanism can include guide members or passageways, for example formed in a housing (FIG. 14) such that the pushrods 112 and retention members 108 do not bind during locking and unlocking operations.

Figure 17:
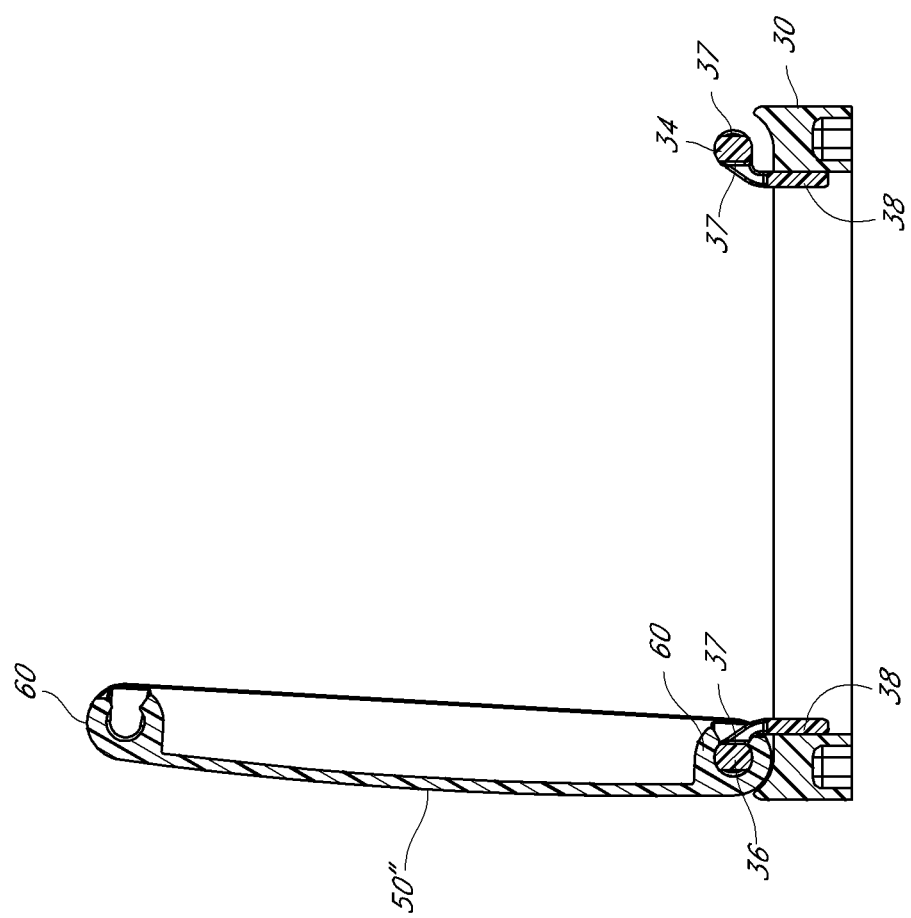
FIG. 17 illustrates a cross sectional view of the lid of FIG. 13 in an open position.
Figure 18:
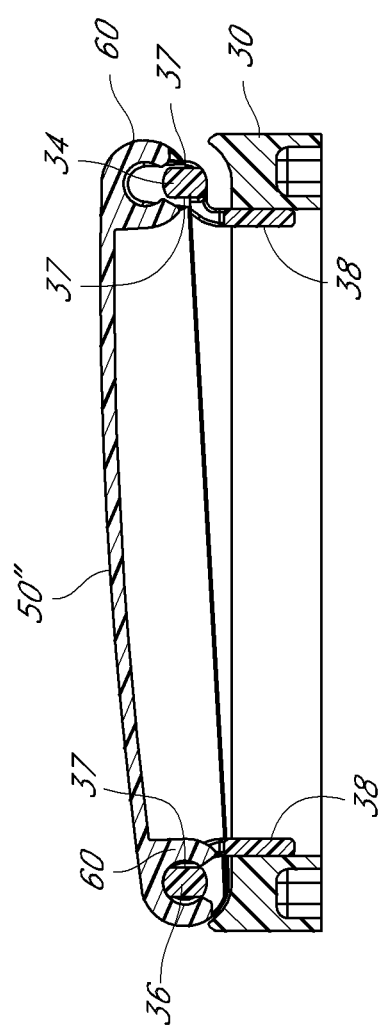
FIG. 18 illustrates a cross-sectional view of the lid of FIG. 13 in a partially open position.

With reference to FIGS. 17-18, the operation of the rotational members 60 on the rods 34, 36 is illustrated in a fully opened and partially-opened position. As indicated, when the lid is initially opened, rotational members 60 can disengage from a mounting rod 34, due to the size and orientation of the flat portion 37 formed in the projection of the generally cylindrical profile of the rod 34. Rotational members 60 on an opposite rod 36 are then rotated into a position where they are not able to disengage from the rod 36 due to the orientation of the corresponding flat portion 37 on that rod 36. While this engagement and disengagement sequence is illustrated with respect to the locking lid 50" illustrated in FIGS. 10-14, it is contemplated that similar geometries of mounting rod 34, 36 and rotational member 60 are equally applicable to other embodiments of lid described herein.

Storage Console Cover Having Locking Lid with Handle

Figure 19:
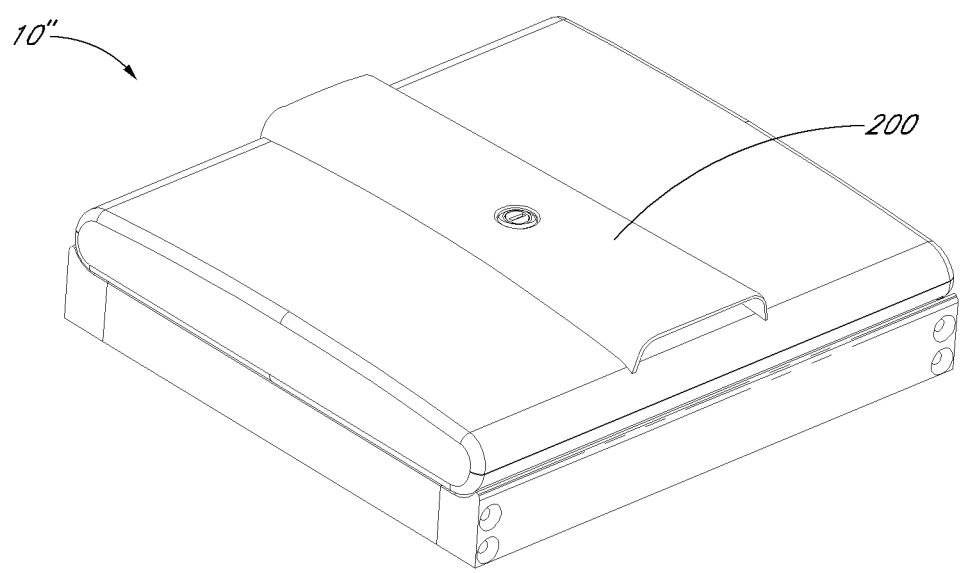
FIG. 19 illustrates a perspective view of another embodiment of a vehicle console cover.

With reference to FIG. 19, an embodiment of storage console cover 10" is illustrated. The storage console cover 10" has a base and a locking lid substantially as described above with respect to FIGS. 10-16. The lid of the storage console over 10" can further comprise a handle portion 200 configured to allow easy opening, removal, or replacement of the lid.

With continued reference to FIG. 19, the handle portion 200 can be coupled to an upper surface of the lid. The handle portion 200 can include a gently bowed surface extending between lateral edges of the lid and defining a recess or passage at each lateral edge of the lid between the handle portion 200 and the upper surface of the lid. A user can grasp the handle portion 200 about the recess or passage at one lateral edge of the lid to raise one lateral edge of the lid to open the storage console cover 10". A user can likewise grasp the handle portion 200 about the recess or passage at both lateral edges of the lid and remove the lid by pulling it vertically away from the base. A handle 200 can be useful where the lid is relatively heavy. For example, it can be desirable that a lid for a vehicle bed cargo box include a handle, as a vehicle cargo box can be relatively large and constructed of a metallic material. In the illustrated embodiment, the handle 200 has replaced contoured recesses in the base 30 and lid 50''', which can allow a user to grasp the lid. In other embodiments, a vehicle storage assembly can include both a handle 200 and contoured recesses.

Storage Console with Integrated Latch and Rotation Member

Figure 20:
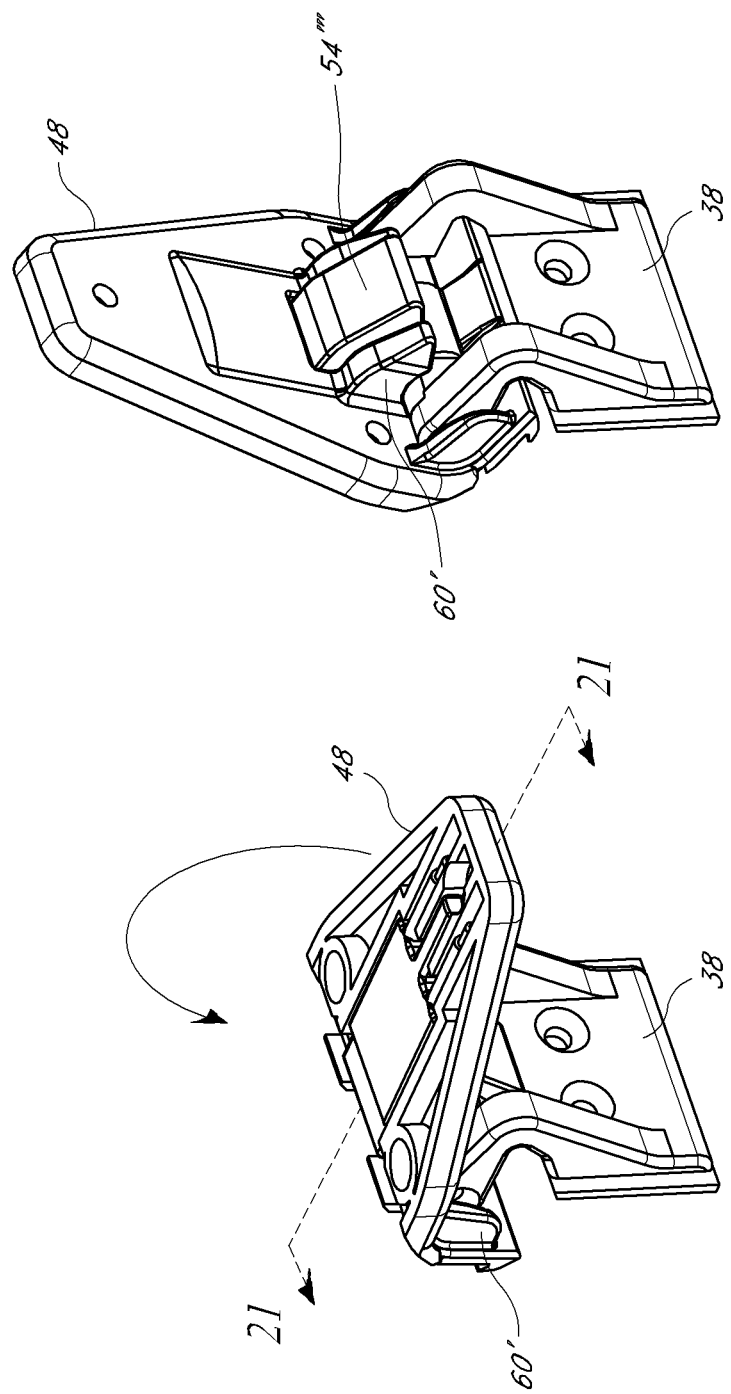
FIG. 20 illustrates a perspective view of a hinge mechanism, in both an open and a closed position, wherein the latch and pivot surface are combined in one unit.
Figure 21A:
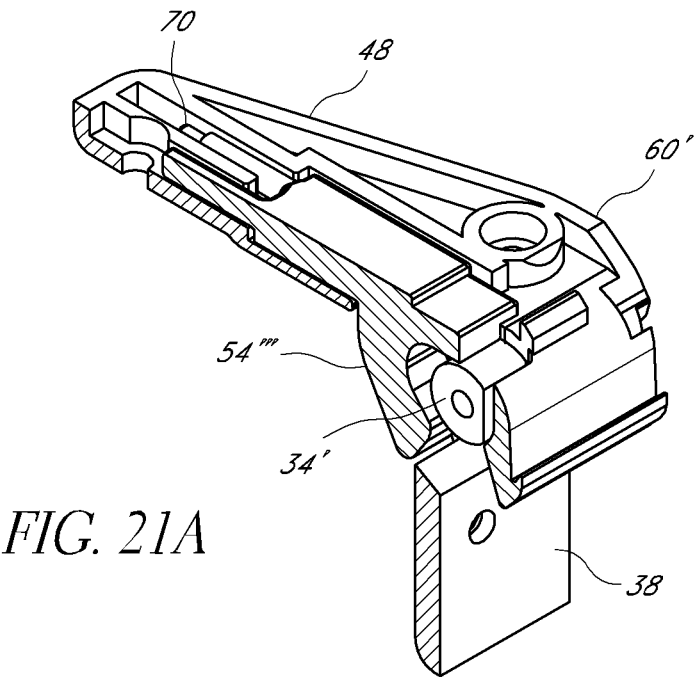
FIG. 21A illustrates a cross-sectional view of the hinge of FIG. 20.
Figure 21B:
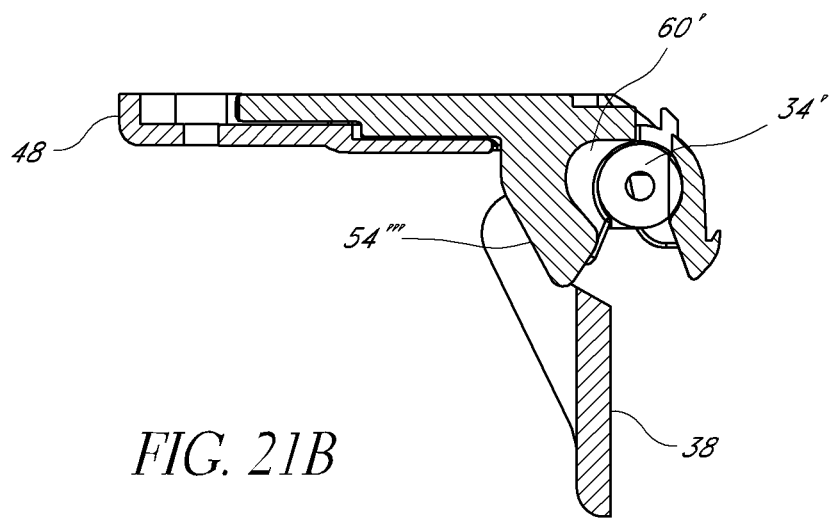
FIG. 21B illustrates a cross-sectional view of the hinge of FIG. 20.
Figure 22:
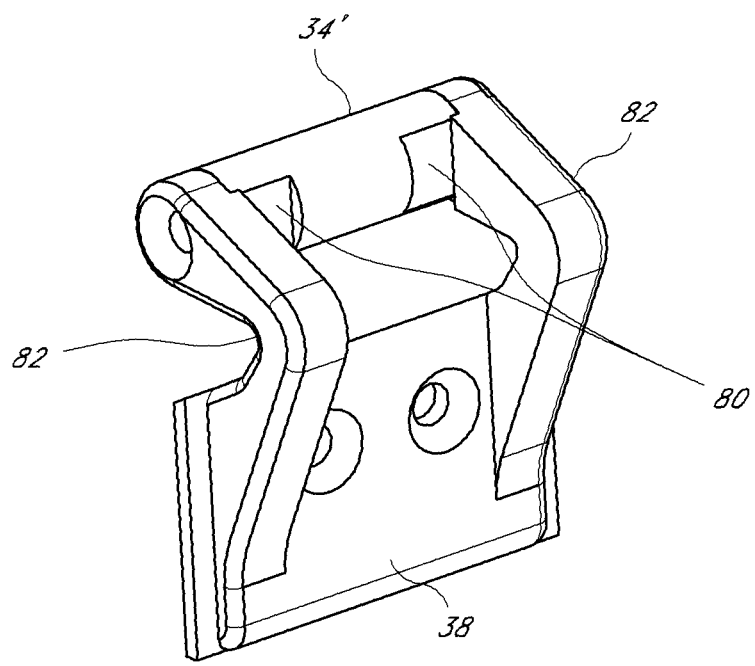
FIG. 22 illustrates a perspective view of the bottom bracket portion of a hinge mechanism.

FIGS. 20-22 demonstrate a hinge of another embodiment. In one such embodiment, the latch 54''' and the rotation member 60' are integrated into a single piece. FIG. 20 illustrates how bracket 38, latch 54''' and rotation member 60' are joined into a single piece. FIG. 20 shows the hinge in both the open and the closed positions. The hinge includes a bracket 38. The bracket 38 includes holes to enable mounting the hinge to the base of the console. The hinge also includes a top bracket 48, which includes holes for mounting the hinge to the lid. By incorporating the latch mechanism into the rotation member, it is possible to use fewer parts when making the lid. Additionally, the integrated unit provides greater security when the lid is closed. Such an embodiment also provides greater stability along the mounting rods when the lid is in an open position.

The latch 54''' is configured to selectively engage the mounting rods 34', 36'. The latch 54''' is desirably biased, such as with springs or flexible biasing members, to engage the mounting rods 34'. FIGS. 21A and 21B represent cross-sectional views of the integrated latch-rotation unit hinge mechanism of FIG. 20. FIG. 21A shows an embodiment wherein a spring 70 is provided to provide bias. The latch 54''' can be of any type suitable to engage the mounting rod 34', or a portion of the mounting rod 34'. In some embodiments, the latch 54''' does not couple directly to the mounting rod 34', but engages a portion of the mounting rod 34', which is appropriately shaped to be received by the latch 54'''.

FIG. 22 shows bracket 38 in isolation. In some embodiments, the mounting rod 34' have flats 80 on the sides adjacent to the arms 82. The rounded portion prevents the latch from releasing from the mounting rod unless sufficient force is applied. When the latch 54''' is engaged, the rotation member 60' is prevented from releasing from the mounting rod 34'. In one embodiment, no external actuation member is required. The user can simply pull the lid up on either one or both side with sufficient force to overcome the bias provided by the rounded portion of the mounting rod 34'. In another embodiment, when a user desires to open the lid, the user can release the latch 54''' by depressing a catch member to release the latch 54''' from the mounting rods 34', 36'. This causes the latch 54''' to enter the released position, which allows the rotation member 60' to release from mounting rods 34'. This allows the rotation member 60' on the opposite side of the lid to rotate about the mounting rods 34' on the hinge mechanisms.

Figure 23:
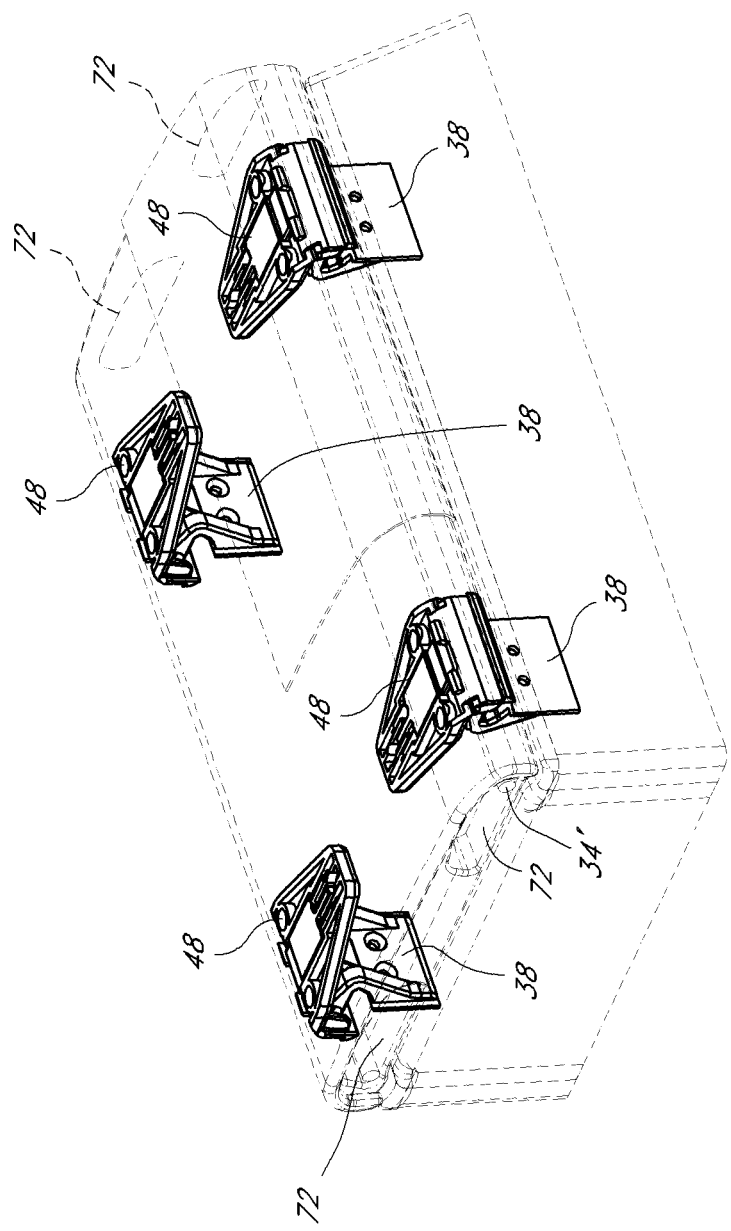
FIG. 23 illustrates a perspective view of a console which incorporates four of the hinge mechanisms of FIG. 20.

FIG. 23 shows an embodiment which includes four hinge mechanisms with the integrated latch and pivot piece in the closed position. In some embodiments, the lid includes four handles 72. The handles are set along the edges of the lid without hinge mechanisms, and there are two handles 72 on each side. This allows for access from either the front or back of the vehicle. This also allows for access from either the driver side or the passenger side of the vehicle.

In some embodiments, only one hinge would include the integrated piece of FIG. 20. In some embodiments, two of the hinges would include the integrated piece of FIG. 20. In another embodiment, three of the hinges would include the integrated piece of FIG. 20. In some embodiments, each hinge has a bottom bracket 38 with arms 82, which support an individual mounting rod 34' with flats 80.

In some embodiments, wherein all hinges include the integrated latch-rotation member piece, the lid will open when both latches on one lateral side (i.e. both on the first or both on the second side) are released. This means that both latches that interact with mounting rods on the same lateral side are released. If only one latch is released, or if two latches on opposite sides are released, the lid will not open.

Figure 24:
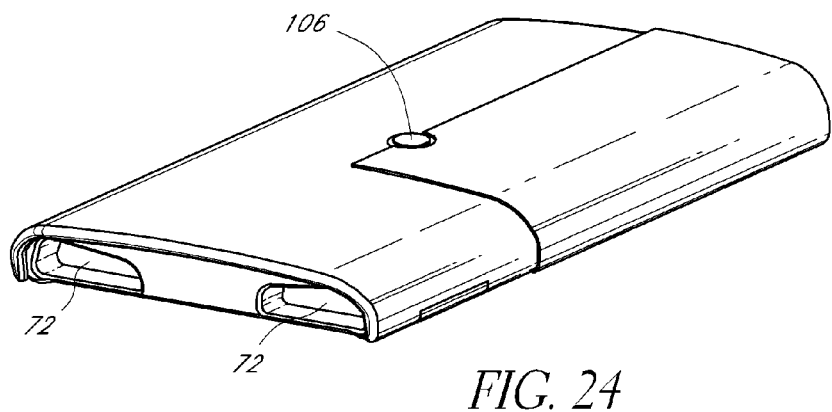
FIG. 24 illustrates a top view of an embodiment of a lid with a lock.
Figure 25:
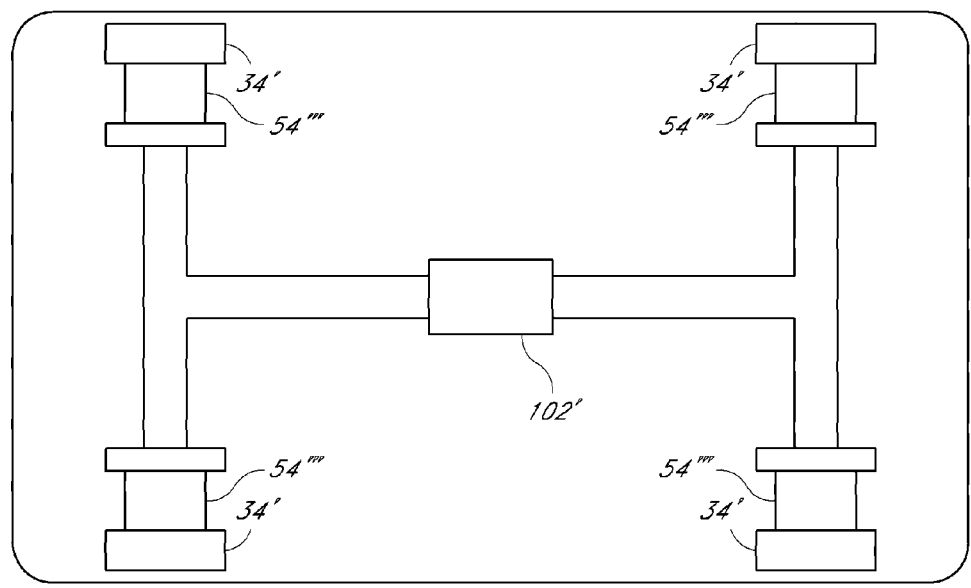
FIG. 25 illustrates a bottom view of an embodiment of a lid with a lock.

FIGS. 24 and 25 illustrate a lid with an optional lock mechanism. In some embodiments, a lock is provided for securing the lid on top of the base. The lid comprises a cam mechanism which is configured to prevent movement of the rotation member 60' around the mounting rod 34'. In addition, a locking console cover can be desirable for a storage console such as a pick-up truck bed cargo box. In the illustrated embodiment, the lock mechanism can comprise a lock cylinder 102' and can be configured to lock and unlock the latches simultaneously. In other embodiments, the lock mechanism can be configured to selectively unlock the latches along the same lateral side, thus allowing the dual access console cover 10' to be locked into a single axis operation mode. In other embodiments, each individual latch can include a lock mechanism that can include none, some, or all of the aspects described herein with respect to the illustrated lock mechanism.

Although this invention has been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while the number of variations of the inventions have been shown and described in detail, other modifications, which are within the scope of these inventions, will be readily apparent to those of skill in the art based upon this disclosure. It is also contemplated that various combinations or subcombinations of the specific features and aspects of the embodiments may be made and still fall within the scope of the inventions. Accordingly, it should be understood that various features and aspects of the disclosed embodiments can be combined with, or substituted for, one another in order to perform varying modes of the disclosed invention. Thus, it is intended that the scope of the present inventions herein disclosed should not be limited by the particular disclosed embodiments described above, but should be determined only by a fair reading of the claims.

What is claimed is:

1. A storage compartment comprising:
   a base comprising:
      a first engagement rod, said first engagement rod disposed along a first side of said base and defining a generally cylindrical first pivot surface defining an axis and at least one release surface recessed from said first pivot surface;
      a second engagement rod, said second engagement rod disposed along a second side of said base and defining a generally cylindrical second pivot surface defining an axis and at least one release surface recessed from said second pivot surface; and
   a cover comprising:
      a first side and a second side;
      four rotation members, said rotation members configured to rotate about said engagement rods, two of said rotation members laterally displaced along each of the first side and the second side of the cover; and
      at least one latch, the at least one latch configured to engage one of the engagement rods, wherein the at least one latch and at least one of the rotation members are combined into a single, integrated latch-rotation unit;

wherein the rotation member of the single, integrated latch-rotation unit comprises a pair of rotation arms spaced laterally apart and having the at least one latch located between the pair of rotation arms.

2. The vehicle storage assembly of claim 1, wherein at least two rotation members and an equal number of latches are combined into more than one integrated latch-rotation units.

3. The vehicle storage assembly of claim 1, wherein all four rotation members and four latches are combined into four, single integrated latch-rotation units.

4. The vehicle storage assembly of claim 1, wherein the cover has four sides.

5. The vehicle storage assembly of claim 1, wherein the engagement rods are metal.

6. The vehicle storage assembly of claim 1, wherein the base is integrally formed with a vehicle.

7. The vehicle storage assembly of claim 1, wherein the plurality of rotation members are adapted to decouple the cover from the engagement rods when the cover is in a first position.

8. The vehicle storage assembly of claim 7, wherein the first position is an open position.

9. The vehicle storage assembly of claim 7, wherein the plurality of rotation members are adapted to inhibit decoupling of the cover from the engagement rods when the cover is in a second position.

10. The vehicle storage assembly of claim 9, wherein the second position is a closed position.

11. A vehicle storage compartment comprising:
a first bracket member, the first bracket member having at least a surface attachment portion in connection with a wall, a pair of arm structures on opposite sides of the first bracket member extending away from the surface attachment portion, and a mounting member extending between the arm structures distal from the surface attachment portion;
a second bracket member, the second bracket member having at least a surface attachment portion in connection with a cover, and a hinge connection element, the hinge connection element configured to releasably retain the mounting member of the first bracket member,
wherein the first and second bracket member are configured to rotate with respect to one another from a closed to an open position;
wherein each of the first and second bracket members further comprise a latching element, the latching element on the first bracket member configured to releasably attach the latching element of the second bracket member when in the open position;
wherein the hinge connection element of the second bracket member comprises a pair of rotation flanges spaced laterally apart and having the latching element located between the pair of rotation flanges.

12. The vehicle storage compartment of claim 11, wherein the mounting member is configured to be generally rounded.

13. The vehicle storage compartment of claim 11, wherein the latching elements are configured to release from one another upon the application of force.

14. The vehicle storage compartment of claim 11, wherein the hinge connection element comprises a spring or flexible biasing member configured to releasably retain the mounting member of the first bracket member.

15. The vehicle storage compartment of claim 11, wherein the cover is generally square shaped and is connected to four first bracket members, the four first bracket members configured to releasably retain the mounting members of four second bracket members on a plurality of walls shaped generally similar to the cover.

* * * * *